April 7, 1970       J. W. HODGINS ET AL       3,505,192
PROCESSES FOR THE CHLORINATION OF METHANE
Filed July 5, 1966

INVENTORS
JOHN W. HODGINS
GEORGE N. WEREZAK
BY Church & Rogers
PATENT AGENTS

United States Patent Office 3,505,192
Patented Apr. 7, 1970

3,505,192
PROCESSES FOR THE CHLORINATION
OF METHANE
John W. Hodgins, Ancaster, Ontario, and George N. Werezak, Sarnia, Ontario, Canada, assignors to Canadian Patents and Development Limited, Ottawa, Ontario, Canada, a corporation of Canada
Filed July 5, 1966, Ser. No. 562,819
Int. Cl. B01j 1/10
U.S. Cl. 204—163  11 Claims

ABSTRACT OF THE DISCLOSURE

A process for the chlorination of methane by irradiating with ionizing radiation a gaseous mixture of from about 90 to 5 mole percent of methane and from about 10 to 95 mole percent of chlorine, at a temperature of from about 25° C. to about 120° C. and at a pressure of from about 750 mm. to 22,500 mm. mercury.

---

Processes for the chlorination of methane on an industrial scale are now well established, the methane commonly being obtained from natural gas, and the chlorine usually being obtained by the electrolysis of sodium chloride. The preferred end products of these processes are methyl chloride and carbon tetrachloride, the intermediate products methylene chloride and chloroform being of less commercial importance.

The processes usually employed hitherto may be roughly characterised as being either photolytic or thermocatalytic. In the usual photolytic-type processes a mixture of methane and chlorine is irradiated with electromagnetic energy of predetermined wavelength in, or in the neighbourhood of, the visual region. The chief problems encountered with such processes are:

(a) The power supply to the energy source usually must be stabilized to maintain the output at the required wavelength, with consequent equipment expense and complication.

(b) The windows of the reaction cell or chamber through which the radiation passes are rapidly dirtied by the cell contents, reducing the transmission efficiency thereof.

(c) The reaction products may be strong absorbers of the incident radiation and if so will lower the reaction efficiency.

(d) The reaction is highly exothermic and readily gives rise to explosive conditions.

The usual catalytic-type processes avoid the difficulties (a) to (c) above, but stable control of these processes is more difficult.

It is an object of the present invention to provide a new process for the chlorination of methane.

In accordance with the present invention there is provided a new process for the chlorination of methane comprising the step of irradiating with ionizing radiation a gaseous mixture of from about 90 to about 5 mole percent of methane with respectively from about 10 to about 95 mole percent of chlorine, at a temperature of from about 25° C. to about 120° C. and at a pressure of from about 750 to about 22,500 mm. mercury, to initiate therein a chain reaction of the methane and chlorine, the irradiation dosage being at least $0.25 \times 10^{18}$ electron volts per gram of absorbing material.

The said pressure preferably is from about 750 to about 10,000 mm. mercury, and the irradiation dosage preferably is from about 0.25 to about $40 \times 10^{18}$ electron volts per gram of absorbing material, more specifically from about 0.5 to about 15 electron volts per gram. The said ionizing radiation preferably has a photon energy of from about 0.5 to about 2 mev., and the radiation may be gamma ray radiation from spent fuel elements of a nuclear reactor. The said chain reaction process may have a G value as defined herein of not less than 30,000.

Figure 1:
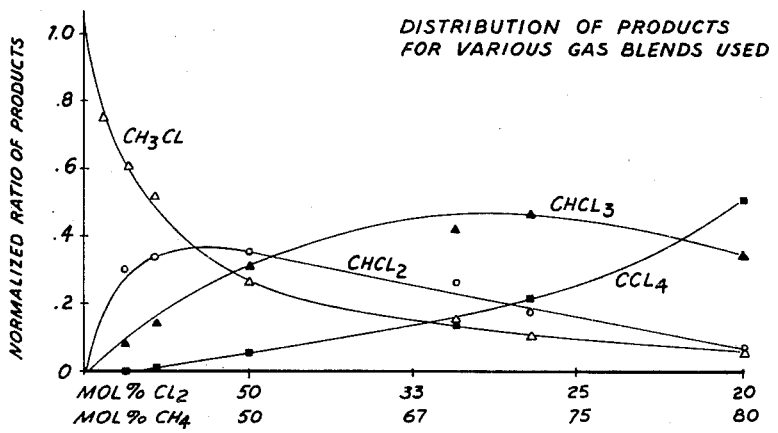
Figure 2:
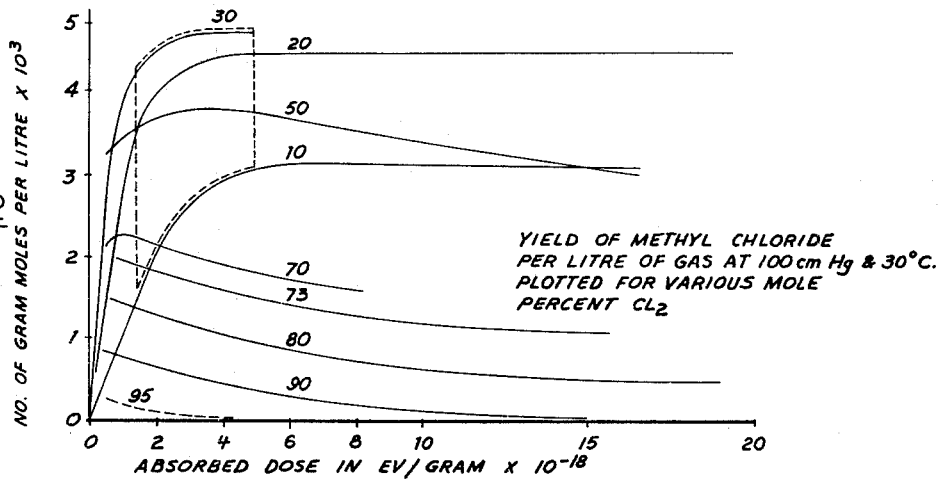
Figure 3:
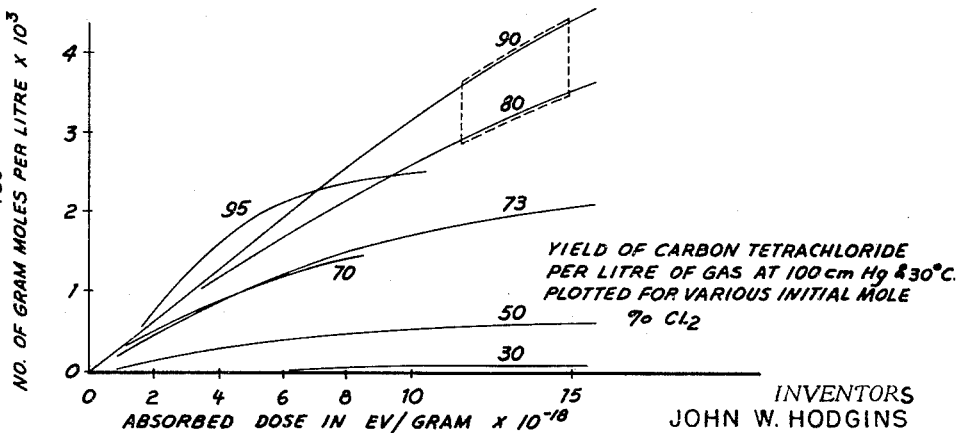

In the following description reference will be made to the accompanying drawings, wherein:

FIGURE 1 illustrates the results of experiments to determine the effect on the distribution of the reaction end products of using different initial reactant mixtures, and FIGURES 2 and 3 illustrate the results of experiments to determine optimum conditions for the production respectively of methyl chloride and carbon tetrachloride.

In a commercial process it will usually be preferred to pass a homogeneous mixture of the methane and chlorine of the required proportions, namely from about 90 to about 5 mole percent of methane and respectively from about 10 to about 95 mole percent of chlorine, continuously through a reaction zone or chamber, provided for example by an elongated cylinder, the mixture flowing therein generally parallel to the longitudinal axis thereof, in which the mixture is exposed to the ionizing radiation, the rate of flow of the gas mixture through the zone being adjusted in relation to the energy output of the source to maintain the dosage at the required value of at least $0.25 \times 10^{18}$ electron volts per gram of absorbing material. Because of the high penetrating power of the radiation employed there is little or no possibility that any part of the reaction zone will be shielded from it, and in particular no appreciable effect is obtained corresponding to the above-described "window dirtying" of a photolytic process. The reaction is strongly exothermic and cooling of both the reaction vessel and the effluent gases is usually required. The interior of the cylinder will usually be provided with suitable baffles to give the required mixing of the reactants and intermediate products and thereby ensure a satisfactory high yield of the final products.

The radiation necessary to initiate the required chain reaction can be high energy particles or photons, preferably having a photon energy in the range from about 0.5 to about 2.0 mev. The radiation source can be any suitable material, such as cobalt 60, cesium 137, spent fuel elements from a nuclear reactor, etc. or any suitable device, such as the core of a nuclear reactor, an X-ray machine or an electron accelerator.

A very satisfactory source of suitable gamma ionizing radiation is spent fuel elements from a nuclear reactor, the energy represented by this radiation otherwise being wasted. Different configurations of the elements may be employed to ensure maximum uitilization of the energy source and of the reaction apparatus. For example, a number of spent fuel elements can be disposed end to end to constitute a single elongated source disposed within and coaxial with the above-described cylinder, or they can be disposed generally parallel to one another to constitute a source of greater width than length. The elongated source is particularly suitable for reactions requiring the higher dosage rates, while the other configuration is more suitable for low dosage reactions.

In particular, the volume of the elements will be sufficiently small relative to the volume of the reaction zone for them to constitute point or line sources, and the element configuration and the gas flow pattern should be such as to ensure that the dosage supplied to all the reactants will remain within the required limits.

The dosage to be applied to the mixture is controlled to control the reaction as closely as possible and thereby obtain the maximum yield of the desired product or products. In general, under uniform pressure conditions an increase in dosage will favour the production of the more highly chlorinated products; the same effect is obtained by an increase in the operating pressure, and by an increase in the operating temperature, so that these effects may be suitably adjusted and correlated when evaluating a particular process for economic desirability. As a specific example of the interaction of these effects on the process, using 80 mole percent chlorine and a dosage of about $12$–$15 \times 10^{18}$ with a pressure of 1000 mm. and a temperature of 30° C. gives predominantly carbon tetrachloride, while at 3000 mm. and 120° C. a dosage of $4 \times 10^{18}$ resulted in the formation of free carbon, the latter reaction competing successfully with hydrogen substitution reactions requiring more severe conditions.

Because of the possibility of the production of explosive conditions the reaction must be suitably monitored as to reactor temperature and pressure, with provision for stopping the irradiation and consequently the reactions, e.g. by dropping the source rapidly from the reaction zone, if dangerous conditions should be indicated. Stable control of the processes of this invention is relatively very easy, since the free radical concentration decreases very rapidly upon removal of the ionizing radiation.

The initiation of chemical reactions usually requires energy in the neighbourhood of 10–15 electron volts, so that any gamma radiation employed has an enormous energy excess and side reactions are inevitable. The reactions obtained in processes in accordance with the invention are chain reactions, and as an indication of the efficiency thereof calculations show that the chlorination reactions have typical G values of from about 30,000 to about 1,270,000 (the G value is the number of relevant chemical occurrences per 100 electron volts absorbed by chlorine) as compared with values of about 7 for the decomposition of methane. We have found it possible to provide reaction conditions such that the required product is produced predominantly. In commercial processes it will usually be desirable to separate at least the required product or products from the unwanted products (such as hydrochloric acid) in the effluent gases and recycle the precursor methanes into the mixture entering the reaction zone. Since the reactions involve the production of atoms and free radicals it is important to ensure that radical scavengers such as oxygen are excluded from the reaction zone.

The gaseous mixture of methane and chlorine, plus any recycled chloromethanes, is introduced to the reaction zone at a pressure of from about 750 to about 22,500 mm. mercury, more preferably in the range of about 750 to about 10,000 mm. mercury, and at a temperature of from about 25° C. to about 120° C., the maximum temperature being that required to suitably maintain the gaseous state. In general, the higher pressures, and especially those above 10,000 mm. mercury, are employed with mixtures comprising the lower chlorine contents. The products of the reaction will be a mixture of methyl chloride, methylene chloride, chloroform, carbon tetrachloride and hydrogen chloride.

The formation of the products is believed to proceed by the following reaction sequence:

$$CH_4 + Cl_2 \rightarrow CH_3Cl + HCl$$

$$CH_3Cl + Cl_2 \rightarrow CH_2Cl_2 + HCl$$

$$CH_2Cl_2 + Cl_2 \rightarrow CHCl_3 + HCl$$

$$CHCl_3 + Cl_2 \rightarrow CCl_4 + HCl$$

$$CH_4 + 2Cl_2 \rightarrow C + 4HCl$$

Each of the four stoichiometric reactions written above is believed to have a reaction mechanism as follows:

Initiation $$Cl_2 + h\nu \rightarrow Cl + Cl$$

Propagation $$Cl + RH \rightleftharpoons R + HCl$$

$$R + Cl_2 \rightleftharpoons RCl + Cl$$

Termination $$Cl + Cl + M \rightarrow Cl_2 + M$$

$$R + Cl \rightarrow RCl$$

$$R + R \rightarrow R_2$$

where

RH can be $CH_4$, $CH_3Cl$, $CH_2Cl_2$ or $CHCl_3$,
M can be a wall site (such as the reactor zone wall) or a non-reacting molecule.

On passing through the reactor in a manner which is govened by proper consideration of heat removal requirements, radiation intensity and reactant conversions, the resulting gaseous mixture is separated into a product stream and a recycle stream. The nature of this separation will depend on the reaction conditions, the materials formed during the irradiation and the final products required.

Referring now to the drawings, the radiation source for the experiments to be illustrated was a 5-kilocurie assembly of stainless steel pencils containing cobalt 60, which has a photon energy of about 1.3 mev. and a half-life of 5.27 years, so that the radiation intensity diminished by about 1% per month.

FIGURE 1 shows the results of experiments carried out on different gas mixtures to determine the effect on the distribution of reaction products of varying the proportions of the mixture. For each experiment the mixture was subjected to the maximum radiation dosage, so as to eliminate distribution variations which are induced by adjustment of the dosage.

The experiments show that under these particular conditions methyl chloride predominantly is produced when the proportion of chlorine is below about 30%, and that carbon tetrachloride is the predominant product when the proportion of chlorine is above 80%.

FIGURE 2 shows the results of experiments carried out on different gas mixtures to determine the effect on the production specifically of methyl chloride of different proportions of reactants and radiation dosages. The number adjacent each line of the figure is the mole percent of chlorine in the mixture. All these experiments were carried out at a pressure of 1000 mm. of mercury and at 30° C. The optimum conditions shown for the production predominantly of methyl chloride are indicated by the broken line outline, and it will be noted that particularly advantageous results are obtained at this temperature and pressure with mixtures comprising 20–30 mole percent of chlorine and a radiation dosage of from about 1 to about $5 \times 10^{18}$ electron volts per gram. More generally, depending upon reactor temperature and pressure, a dosage of from about 0.25 to about $5 \times 10^{18}$ electron volts per gram is used for methyl chloride production.

FIGURE 3 shows the results of corresponding experiments to determine optimum conditions for the production of carbon tetrachloride, such conditions at the temperature and pressure employed comprising from about 80 to about 90 mole percent chlorine, with a dosage of from about 12 to about $15 \times 10^{18}$ electron volts per gram. More generally, depending upon reactor temperature and pressure, the dosage rate for carbon tetrachloride production is from about 0.25 to $40.0 \times 10^{18}$ electron volts per gram. For methylene chloride production under these conditions of temperature and pressure the preferred proportions are from 30 to 50 mole percent of chlorine, with a specific dosage of from about 3 to about $7 \times 10^{18}$ electron volts per gram; the more general dosage depending upon reactor temperature and pressure is from about 0.25 to about $7.0 \times 10^{18}$ electron volts per gram. For chloroform production the mixture should contain about 50 to about 80 mole percent of chlorine, the specific dosage should be from about 7 to about $12 \times 10^{18}$ electron volts per gram, and the general dosage depending upon reactor temperature and pressure should be from about 0.25 to about $12.0 \times 10^{18}$ electron volts per gram.

The following specific examples also illustrate the invention:

EXAMPLE 1

A mixture comprising 30 mole percent chlorine and 70 mole percent methane at a pressure of 9970 mm. mercury and temperature of 120° C. was irradiated to a total dose of $1.0 \times 10^{18}$ electron volts per gram. The resulting gas mixture was separated by standard practices to give the following output of chloromethanes per 1000 litres of reactants.

| | Gram moles |
|---|---|
| $CH_3Cl$ | 40.6 |
| $CH_2Cl_2$ | 17.2 |
| $CHCl_3$ | 3.6 |
| $CCl_4$ | 0.0 |

The enhanced output of methyl chloride and absence of carbon tetrachloride will be noted.

EXAMPLE 2

A mixture comprising 50 mole percent chlorine and 50 mole percent methane at a pressure of 4495 mm. mercury and temperature of 90° C. was irradiated to a total dose of $2.5 \times 10^{18}$ electron volts per gram. The resulting gas mixture was separated by standard practices to give the following output of chloromethanes per 1000 litres of reactants.

| | Gram moles |
|---|---|
| $CH_3Cl$ | 14.7 |
| $CH_2Cl_2$ | 18.3 |
| $CHCl_3$ | 13.4 |
| $CCl_4$ | 1.6 |

The enhanced output of methylene chloride and the more uniform distribution of products (as compared with Example 1) will be noted.

EXAMPLE 3

A mixture comprising 70 mole percent chlorine and 30 mole percent methane at a pressure of 3000 mm. mercury and temperature of 120° C. was irradiated to a total dose of $4.0 \times 10^{18}$ electron volts per gram. The resulting gas mixture was separated by standard practices to give the following output of chloromethanes per 1000 litres of reactants.

| | Gram moles |
|---|---|
| $CH_3Cl$ | 2.61 |
| $CH_2Cl_2$ | 5.91 |
| $CHCl_3$ | 12.74 |
| $CCl_4$ | 5.14 |

The enhanced production of the higher chloromethanes will be noted.

What we claim is:

1. A process for the chlorination of methane comprising the step of irradiating with ionizing radiation a gaseous mixture of from about 90 to about 5 mole percent of methane with respectively from about 10 to about 95 mole percent of chlorine, at a temperature of from about 25° C. to about 120° C. and at a pressure of from about 750 to about 22,500 mm. mercury, to initiate therein a chain reaction of the methane and chlorine, the radiation dosage being at least $0.25 \times 10^{18}$ electron volts per gram of absorbing material.

2. A process as claimed in claim 1, wherein the said pressure is from about 750 to about 10,000 mm. mercury.

3. A process as claimed in claim 1, wherein the irradiation dosage is from about 0.25 to about $40 \times 10^{18}$ electron volts per gram of absorbing material.

4. A process as claimed in claim 3, wherein the irradiation dosage is from about 1 to about $15 \times 10^{18}$ electron volts per gram of absorbing material.

5. A process as claimed in claim 1, wherein the ionizing radiation has a photon energy of from about 0.5 to about 2 mev.

6. A process as claimed in claim 5, wherein the ionization radiation is gamma ray radiation from spent fuel elements of a nuclear reactor.

7. A process as claimed in claim 1, wherein the said chain reaction process has a G value as defined herein of not less than 30,000.

8. A process as claimed in claim 1, and for the preparation predominantly of methyl chloride, wherein the said mixture includes from 90 to 70 mole percent of methane and from 10 to 30 mole percent of chlorine, the general irradiation dosage being from 0.25 to $5.0 \times 10^{18}$ electron volts per gram of absorbing material.

9. A process as claimed in claim 1, and for the production predominantly of methylene chloride, wherein the said mixture includes from 70 to 50 mole percent of methane and from 30 to 50 mole percent of chlorine, the general irradiation dosage being from 0.25 to $7.0 \times 10^{18}$ electron volts per gram of absorbing material.

10. A process as claimed in claim 1, and for the production predominantly of chloroform, wherein the said mixture includes from 50 to 20 mole percent of methane and from 50 to 80 mole percent of chlorine, the general irradiation dosage being from 0.25 to $12 \times 10^{18}$ electron volts per gram of absorbing material.

11. A process as claimed in claim 1, and for the preparation predominantly of carbon tetrachloride, wherein the said mixture includes from 30 to 10 mole percent of methane and 70 to 90 mole percent of chlorine, the general irradiation dosage being from 0.25 to $40.0 \times 10^{18}$ electron volts per gram of absorbing material.

References Cited

UNITED STATES PATENTS

| 2,688,592 | 9/1954 | Skeeters et al. | 204—163 |
| 3,117,068 | 1/1964 | Morrow et al. | 204—163 X |

HOWARD S. WILLIAMS, Primary Examiner